United States Patent Office 3,479,480
Patented Nov. 18, 1969

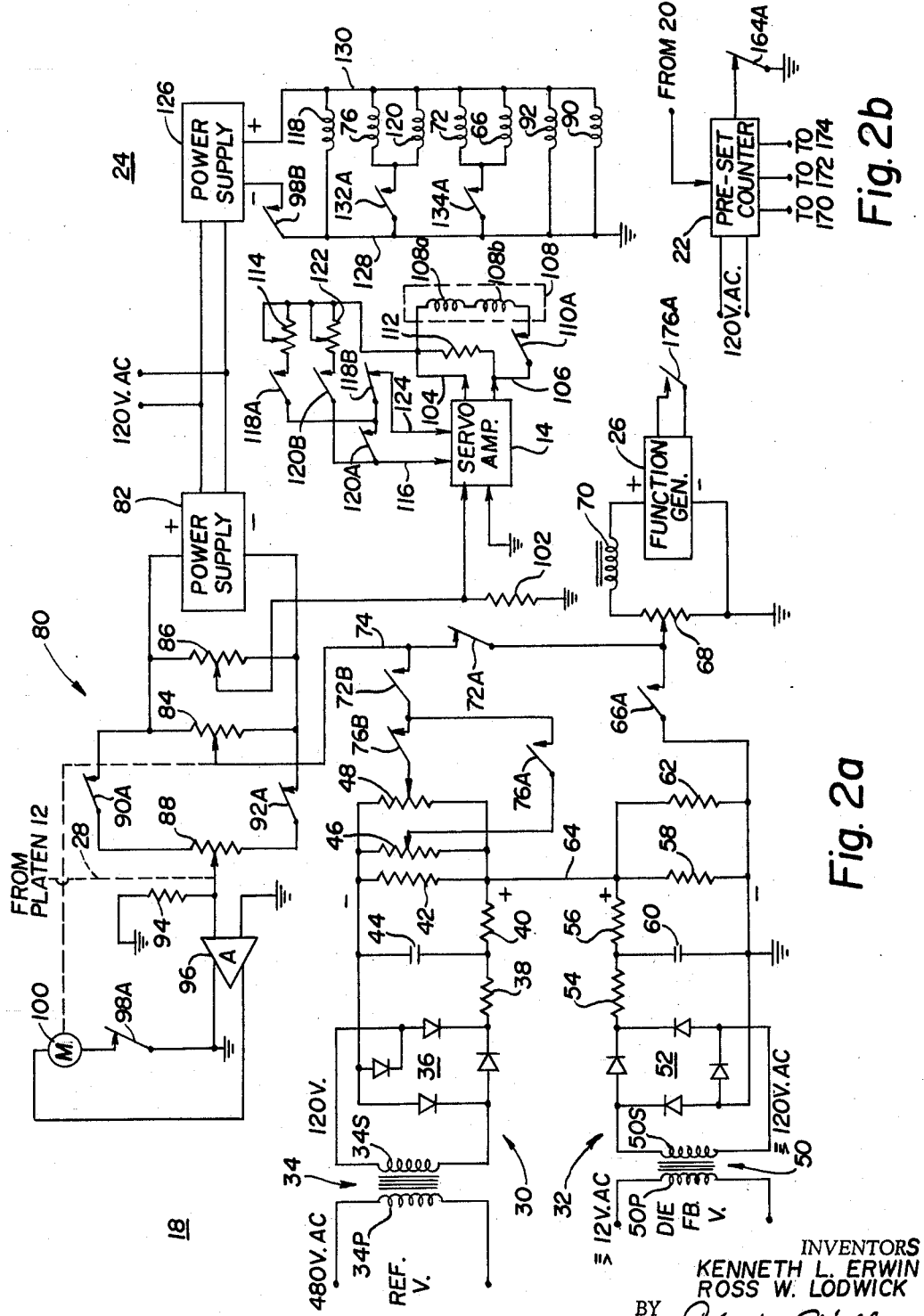

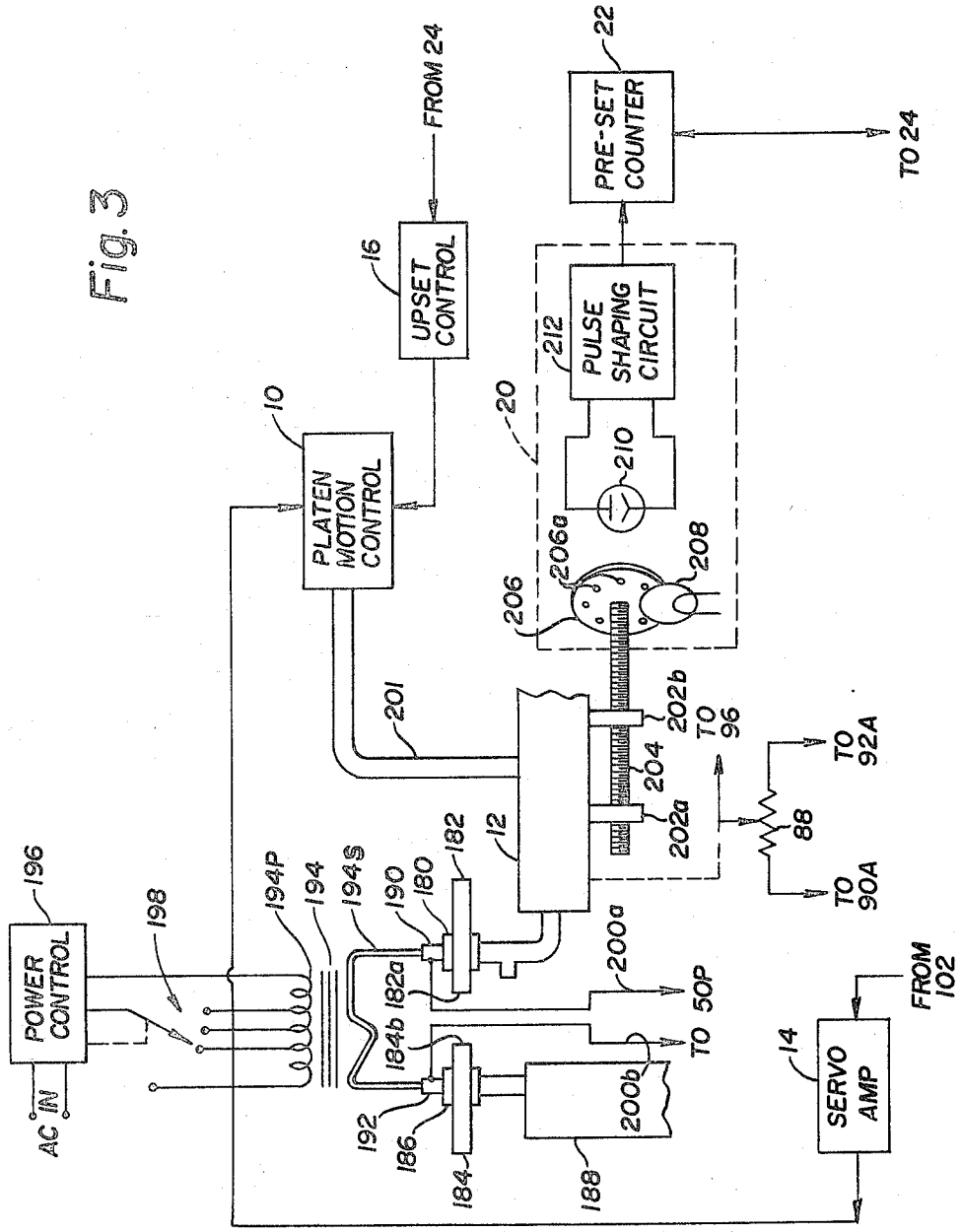

3,479,480
FLASH WELDER
Kenneth L. Erwin, Reno, Nev., and Ross W. Lodwick, Poland, Ohio, assignors to The American Welding and Manufacturing Company
Filed Oct. 23, 1967, Ser. No. 677,174
Int. Cl. B23k 9/00, 11/04
U.S. Cl. 219—97
48 Claims

ABSTRACT OF THE DISCLOSURE

Rate of movement of a movable workpiece toward a fixed workpiece during a pre-flash and/or a pre-heat portion of a flash welding cycle is controlled by feedback signals proportional to voltage drop between the two workpieces. During a flash portion of the cycle, motion of the movable workpiece is controlled by a function generator. Duration of the pre-flash portion of the cycle is controlled as a function of distance moved by the movable workpiece; duration of the pre-heat portion is controlled as a function of time; duration of the flash portion of the cycle is controlled as a function of distance moved by the movable workpiece.

CROSS REFERENCE TO RELATED APPLICATION

Application Ser. No. 556,090 filed June 8, 1966 by K. L. Erwin and R. W. Lodwick, entitled "Flash Welder."

BACKGROUND OF THE INVENTION

Field of the invention

This invention relates to flash welding and, more particularly, to a method and apparatus for controlling motion of platens relative to each other, which platens hold workpieces that are to be flash welded together.

Description of the prior art

In flash welding, two workpieces that are to be welded are brought together, while a welding potential is applied between them so that as they engage each other a flash weld is formed along their abutting surfaces. Flash welding may be thought of as including four principal steps.

During the first of these steps, which corresponds to a "pre-flash" portion of the welding cycle, the edges of the two workpieces that are to be welded together are smoothed off. This is accomplished by bringing these two edges close to each other and applying a voltage between the two workpieces to cause arcing. Projections and ragged portions of the edges are burned off by this pre-flashing process.

The second main step in flash welding, which corresponds to a "pre-heat" portion of the welding cycle, involves heating of the two workpieces to a proper temperature for welding. This is done as the workpieces are brought closer together than in the prior pre-flash step.

The third step in flash welding, which corresponds to a "flash" portion of the cycle, occurs after the two workpieces have been brought to the proper temperature for welding. In this third step, the two workpieces are moved together at a predetermined variable speed, until the two abutting edges of the workpieces are substantially in contact with each other.

After the third or flash portion of the welding process is completed, the weld itself is completed by forcing the two abutting edges of the workpieces together with a predetermined force to effect the weld. This fourth and final step is called "upsetting," and is uncontrolled so far as motion of the workpieces together is concerned.

It has been found that the quality of the weld obtained in flash welding is dependent to a great extent upon the pattern of motion of the two workpieces during the first three stages or portions of the welding cycle. If this movement is improper, an unsatisfactory weld results. Furthermore, if the movement is not closely controlled, the welds will be unpredictable.

If the workpieces are brought together at an improper rate of speed during the pre-flash portion of the cycle, high or low spots may be left on the opposing workpiece surfaces. Similarly, improper control during the pre-heat portion may result in the workpieces not attaining correct temperature for flashing. If the workpieces are brought together too rapidly during the flash portion of the cycle, a preliminary welding and freezing can occur along the edges of the workpieces. Conversely, if the workpieces are brought together too slowly, or if the upsetting portion of the welding cycle does not occur at the proper time, a layer of oxidized metal may be included within a weld, which makes the weld virtually unusable.

Because of these factors, it is very desirable that the patterns of relative motion between the platens that hold the workpieces be closely controlled, so that predictable welds may be obtained from a series of similar materials.

It is possible to control the relative motion of the platens carrying the workpieces during the various steps of flash welding by using voltages that are obtained from electronic analog function generators. These voltages may be used to control various types of actuating mechanisms for moving one platen relative to the other. For example, they may control a hydraulic drive system for varying the amount of fluid flowing through servo valves that control the position of a movable platen. In this manner, the arbitrary voltage derived from the analog function generators can move the platen in a predetermined position pattern. Feedback voltages are provided from the movable platen, which are indicative of the actual position of the platen, and these voltages are compared with the arbitrary voltages from the function generators by means of a servo system to position the movable platen in accordance with the output voltages of the function generators.

In one type of system, a plurality of function generators are utilized to position the movable platen according to one of a plurality of parabolic functions. A digital counter is utilized to enable switching from one function generator to another as the movable platen moves towards the fixed platen during various portions of the welding cycle. However, an analog servo system is still utilized to compare the actual position of the movable platen with the desired position as indicated by the output of one of the function generators. The referenced U.S. patent application of Erwin and Lodwick describes such a system.

Such a system depending on position feedback and a servo system to properly position the platens relative to each other is subject to error due to the servo system. Also, it has been found that, when welding certain types of metals, the actual positions of the platens relative to each other are not nearly as important as the voltage drop existing between the two workpieces. This is particularly true during the pre-flashing and pre-heating portions of the welding cycle. It has been found that the voltage drop between the two workpieces provides the most accurate indication yet obtainable of the degrees of smoothness of the abutting workpiece surfaces (lack of pits and projections), and of the proper separation of the workpieces while pre-heating is taking place.

Accordingly, it is a general object of the present invention to provide a method and apparatus for flash welding that does not depend on a comparison of the actual relative positions of the platens with desired relative positions of the platens during the welding operation.

It is another general object of the invention to provide a method and apparatus for flash welding, which eliminates the use of a servo system for controlling the positions of the platens relative to each other during a welding cycle.

It is a further object to provide a method and apparatus, wherein voltage drop across the workpieces controls the rate of relative movement of the workpieces toward each other during a major portion of the welding cycle.

SUMMARY OF THE INVENTION

According to the present invention, a position feedback servo system is initially used for a brief time prior to clampng the workpieces to the platens and starting a welding operation. This is done in order to adjust the circuitry to an initial condition proper for the start of automatic operation.

After the platens have been initially positioned at their maximum predetermined distance apart, the workpieces are clamped into place in dies secured to the platens and the sequence of steps comprising a flash welding operation is initiated. A first constant reference signal is provided which tends to control the motion of the movable platen toward the fixed platen at a fixed rate of speed during a pre-flash portion of the welding cycle. However, the first constant reference signal is modified by a feedback signal proportional to voltage drop between the two workpieces carried by the platens. Motion of the movable workpiece toward the fixed workpiece is slowed as the voltage drop across them decreases. When the movable workpiece has moved a predetermined distance toward the fixed workpiece, as determined by a pre-set digital counter, the pre-flash portion of the welding cycle is terminated and a pre-heat portion of the cycle is initiated.

During the pre-heat portion of the cycle, a second constant reference voltage tends to move the two workpieces together. This second reference voltage is also modified by the feedback voltage proportional to the voltage drop between the two workpieces. When a desired position has been reached for the pre-heat portion of the cycle, movement of the workpieces relative to each other is effectively stopped, and the movable workpiece will oscillate about its position during the remainder of the pre-heat portion of the cycle. After a predetermined period of time defining the pre-heat portion of the welding cycle, the third step or flashing portion of the cycle is initiated.

During the third step or flash period, movement of the movable workpiece toward the fixed workpiece is controlled by the output of a function generator, which constitutes a third reference voltage. There is no constant reference voltage provided in the system, and there is no position feedback or voltage feedback system provided. After a movable workpiece has moved a predetermined distance, as measured by the digital counter, the flashing portion of the cycle is terminated. At this time, the abutting edges of the two workpieces to be welded are substantially in contact with each other.

The fourth step or upsetting portion of the welding cycle is initiated by the digital counter reaching a predetermined count at which time the function generator is removed from the motion-controlling circuit. A predetermined force is then exerted between the two workpieces to force them together and upset the metal to complete the weld. During this fourth stage of the welding cycle, motion of the two workpieces relative to each other is uncontrolled and occurs only because of upsetting resulting from the predetermined force exerted by the movable workpiece against the fixed workpiece.

After the upset portion of the welding cycle has been completed, the workpiece in the movable platen is unclamped and the platens are moved apart. The workpieces may then be removed from the dies in which they are secured and, after the platens have been repositioned under control of the position feedback servo system, a new welding cycle may be initiated.

It is pointed out the first two portions of the welding cycle may be combined into one, or one or the other portion may be eliminated. For example, it may be unnecessary to pre-flash, in which case the first portion of the cycle would be the pre-heat portion. Similarly, the pre-heat portion may be eliminated, if sufficient heat is generated during the pre-flash step in the cycle. In all events, however, the workpieces would be relatively moved toward one another by a predetermined amount at a rate which is a function of the voltage drop between the workpieces.

BRIEF DESCRIPTION OF THE DRAWINGS

FIGURE 2(a) is a schematic diagram of a sensing and balancing circuit used in the embodiment shown in FIGURE 1;

FIGURE 2(b) shows connections to a function generator included in FIGURES 1 and 2(a);

FIGURE 3 is a detailed diagram, partially schematic, showing a portion of the embodiment of FIGURE 1.

DESCRIPTION OF A PREFERRED EMBODIMENT

Figure 1:
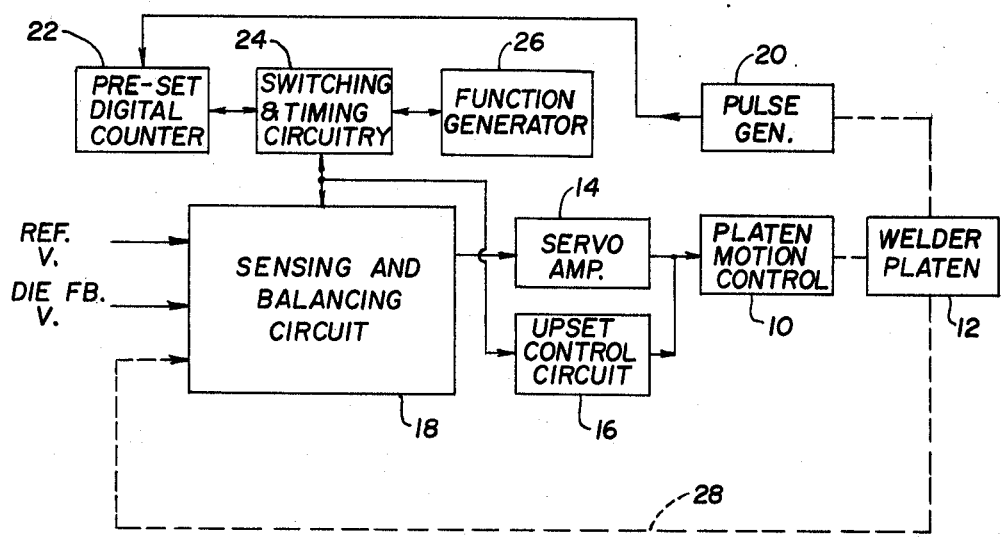
FIGURE 1 is a block diagram illustrating an embodiment of the invention.

FIGURE 1 is a block diagram of an overall system embodying the present invention, in which a platen motion control unit 10 is adapted to control the motion of a movable platen 12 in a flash welder. The movable platen 12 and a stationary platen (not shown in FIGURE 1) each hold different ones of two workpieces that are to be welded together. Although two workpieces are referred to throughout the specification and claims, it is to be understood that the term encompasses a single workpiece, such as an incomplete circular form, having two ends that are welded together to complete the circular form.

The platen motion control unit 10 changes the position of the movable platen in response to signals received either from a servo amplifier 14 or from an upset control circuit 16. The term "servo amplifier" is used to describe the amplifier 14 in a generic sense, in that it provides signals to the platen motion control unit 10. However, in a specific sense, the servo amplifier 14 does not compare two signals and provide an output signal proportional to the difference of the two input signals, but rather receives one input signal. Such operation will be well understood by one skilled in the art.

Suitable flash welders having motion control units 10, servo amplifiers 14, upset control circuits 16 and two relatively movable welder platens are well-known in the art and are commercially available. Therefore, such basic welders will not be further described.

The platen motion control unit 10 comprises hydraulic mechanism, which moves the welder platen 12 toward a fixed platen, with each platen carrying a die for holding a workpiece, while a voltage is applied between the two platens, dies and workpieces. As the movable platen moves toward the fixed platen, an arc is formed between the workpieces during the pre-flash portion of the welding cycle to burn off any ragged edges or projections from the surfaces that are to be welded together. During the pre-heat portion of the welding cycle, this arc also heats to a near molten state the surfaces that are to be welded together. When these two steps are completed, the movable workpiece is moved toward the fixed workpiece at a relatively high rate of speed to effect the flash welding operation, and the two workpieces are then forced together in the final upset portion of the cycle to upset the metal and complete the weld.

The first three steps in the welding cycle are controlled by signals provided to the servo amplifier 14 from a sensing and balancing circuit 18. A constant reference voltage is supplied to the sensing and balancing circuit 18 along with a feedback voltage from the dies which hold the workpieces to be welded together. The feedback voltage is proportional to the voltage drop existing between the two workpieces. In the absence of a die sensing feedback voltage, the constant reference voltage input to the circuit 18 will cause a first reference signal to be provided to the servo amplifier 14 that will tend to cause the platen motion control unit 10 to move the movable platen 12 toward the fixed platen at a fixed rate of speed during the pre-flash operation. However, the die sensing feedback voltage modifies this first reference signal to produce a first output signal, so that when a predetermined voltage exists between the two workpieces motion between them is virtually stopped. When this occurs, the movable welder platen 12 will tend to oscillate slightly about its position relative to the position of the fixed platen and move slowly toward the fixed platen by a predetermined amount.

During the second portion of the welding cycle, while the workpieces are being pre-heated to a desired temperature, a second reference voltage is derived from the constant reference voltage input to the circuit 18, which is again modified by the feedback voltage from the two workpieces to produce a second output signal. During this pre-heat portion of the welding cycle, the movable welder platen 12 oscillates slightly about a position relative to the fixed or stationary platen that is different from its position during the pre-flash portion of the welding cycle.

As the movable welder platen 12 moves toward the fixed welder platen, a pulse generator 20 generates a pulse for each unit of distance traversed by the movable welder platen 12. The pulses generated by the pulse generator 20 are electrically connected to actuate a pre-set digital counter 22. The digital counter 22 is bi-directional, and sends a first signal to the sensing and balancing circuit 18 when the movable welder platen 12 has moved toward the stationary platen by a distance sufficient to complete the pre-flash portion of the welding cycle. When that first signal is received by the sensing and balancing circuit 18, it causes the output of the sensing and balancing circuit 18 to the servo amplifier 14 to be switched from the first output signal to the second output signal for the pre-heat portion of the welding cycle.

The duration of the pre-heat portion of the welding cycle is under the control of a pre-heat timer embodied in switching and timing circuitry 24. The relative distance between the movable welder platen 12 and the fixed welder platen has no effect on the duration of the pre-heat portion of the cycle. When a sufficient time (predetermined) has elapsed to complete the pre-heat portion of the welding cycle, the switching and timing circuitry 24 causes the sensing and balancing circuit 18 to remove the first and second output voltages from the servo amplifier and to provide a third output voltage to the servo amplifier from a function generator 26.

As previously noted, the first two steps of the welding cycle may be combined into one, or one of them may be eliminated, depending on the particular welding application. It may be that in one situation, the ends of the workpieces are sufficiently squared and smoothed to permit eliminating the pre-flash portion of the cycle. In that case, only the second output signal need be utilized to move the movable platen into pre-heat position where it remains for the predetermined period of time necessary to pre-heat the workpieces. Similarly, if sufficient heat is generated in the workpieces during pre-flash to ready them for flashing, the pre-heat timer may be set to "zero," so that the pre-heat step in the cycle is effectively eliminated. In the latter case, the rate of movement of the movable platen toward the fixed platen would still be a function of the voltage drop between the workpieces.

The third output signal from the function generator 26, which is of parabolic form, controls the motion of the movable welder platen 12 toward the stationary platen during the flash portion of the welding cycle. The duration of the flash portion of the cycle is determined by the amount of movement of the movable platen 12 toward the stationary platen, as indicated by the number of pulses received by the digital counter 22 from the pulse generator 20. When a predetermined number of pulses have been received by the digital counter 22, indicating that the movable platen 12 has moved a predetermined distance toward the stationary platen, a second signal is sent from the counter 22 to the sensing and balancing circuit 18, which causes the upset control circuit 16 to take control of the platen motion control unit 10 away from the servo amplifier 14.

When the upset control circuit 16 takes control of the platen motion away from the servo amplifier, the welding cycle is in its final or upsetting portion. During this portion, a predetermined force is exerted between the movable platen 12 and the stationary platen to force the workpieces together and upset the molten metal. This predetermined force depends upon the design of the platen motion control unit 10, and is not controlled by any signals provided through the sensing and balancing circuit 18. The upset portion of the welding cycle may be terminated by a timer or manually by an operator as desired, after which one of the workpieces is released and the movable platen returns to its original or starting position.

As previously noted, prior to the initiation of a welding cycle, the movable welder platen moves away from the fixed platen to an initial starting position at a rate of speed which is adjustable by the operator by means of a potentiometer in the sensing and balancing circuit 18. The movable welder platen 12 is also mechanically connected into the sensing and balancing circuit 18, as indicated by the broken line 28. The movable welder platen 12 is mechanically connected to move the arm of a potentiometer in the sensing and balancing circuit, which is in electrical circuit with other portions of the sensing and balancing circuit only during that period before the welding cycle starts. The voltage obtained from the potentiometer driven by the movable welder platen 12 is utilized initially to adjust the sensing and balancing circuit, so that when the welding cycle is started there will be no requirement for an abrupt, large movement of the movable platen. When the welding cycle is started, the potentiometer connected to the movable welder platen 12 is electrically disconnected from the remainder of the sensing and balancing circuit and plays no further part in the operation until the welding cycle is completed.

Apparatus embodying the invention and its method of operation will be better understood from the detailed circuitry of FIGURES 2(a), (b) and (c). As is apparent from those figures, the circuitry contains a great number of relays, each having a plurality of contact sections. Due to the multiplicity of relays, it would be extremely confusing to connect all of the actuating coils mechanically with the relay contact sections they actuate. Thus such mechanical connections have been eliminated. However, each relay actuating coil is designated by a numeral, and the various contact sections controlled by that actuating coil are designated by the same numeral followed by suffixes A and B, etc. All relay contacts are shown in their positions assumed when the relays are de-energized.

Figure 2C:
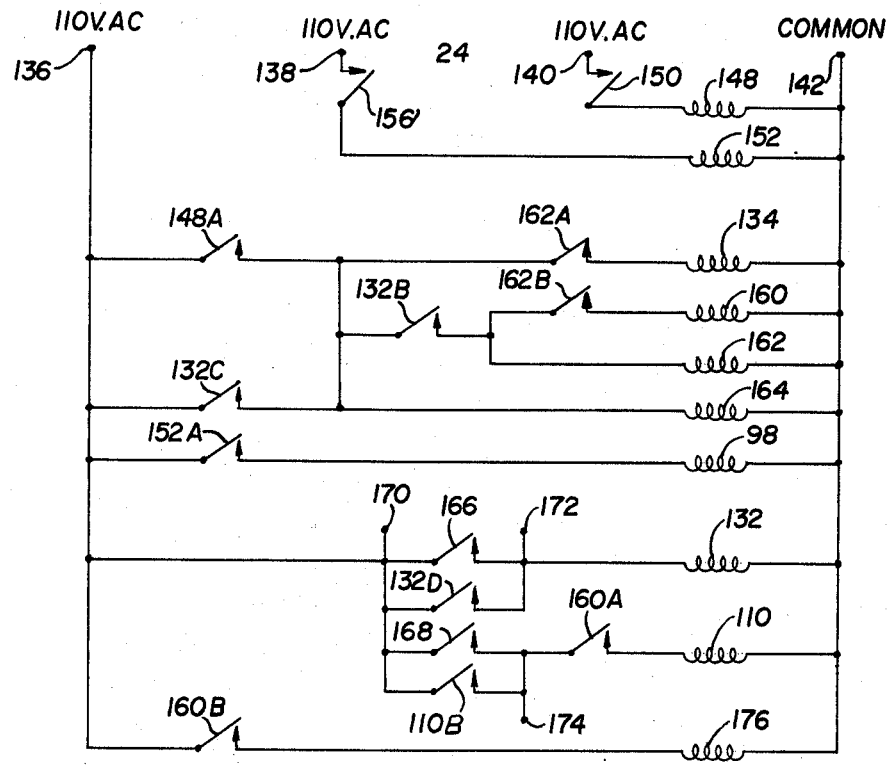
FIGURE 2(c) is a schematic diagram showing switching circuitry utilized in conjunction with the circuitry shown in FIGURES 1, 2(a) and 2(b)

FIGURE 2(a) shows primarily the sensing and balancing circuit 18, along with a portion of the switching and timing circuitry 24 shown at the right hand side of the figure. FIGURE 2(b) shows the connections of the pre-set timer 22 shown in FIGURE 1, and FIGURE 2(c) shows the remainder of the switching and timing circuitry 24.

As seen in FIGURE 2(a), the sensing and balancing circuit 18 includes a reference voltage channel, designated generally by the numeral 30 and a die sensing feedback voltage channel, designated generally by the numeral 32. The reference voltage channel 30 comprises a transformer 34 having a primary winding 34P, which is connected to a conventional alternating current source of 480 volts. The transformer 34 has a secondary winding of 34S, which provides an alternating current potential of 120 volts. A conventional fullwave rectifier bridge 36 has input terminals connected across the secondary windings 34S and output terminals across which are connected series-connected resistors 38, 40, 42. A capacitor 44 is conected across the fixed resistors 40, 42 to provide filtering action for the pulsating direct current output of the bridge 36. Output signals from the reference voltage channel 30 are provided by movable arms of potentiometers 46, 48, which potentiometers are connected in parallel across the fixed resistor 42. The potentiometer 48 serves as a pre-heat balance adjustment, and the potentiometer 48 serves as a pre-flash balance adjustment.

The die feedback voltage channel 32 is similar to the reference voltage chanel 30 previously described, and comprises an input transformer 50, having a primary winding 50P and a secondary winding 50S. The primary winding 50P is connected to receive a signal from the welder dies, which is equal to the voltage drop existing between the two workpieces to be welded together. That voltage is an alternating voltage that varies between a minimum value and a miximum value of 12 volts. The secondary winding 50S of the transformer provides an alternating voltage that varies between a minimum value and 120 volts, which is rectified by a conventional fullwave rectifier bdidge 52. whose input terminals are connected across the winding 50S. Output terminals of the bridge 52 are connected to series-connected fixed resistors 54, 56, 58 with the negative output terminal being grounded. A filter capacitor 60 is connected across the resistor 56, 58, and another fixed resistor 62 is connected in parallel with the resistor 58. The juncture of the resistors 56, 58 is connected by a lead 64 to the juncture of the resistors 40, 42 in the reference voltage channel 30, in a manner such that the voltage provided from the die feedback channel 32 is added to the voltage produced from the reference voltage channel 30.

The grounded negative output terminal of the rectifier 52 in the die feedback voltage channel 32 is connected through a normally-open relay contact 66A to a movable arm of a potentiometer 68, which serves as a ramp gain adjustment. The relay contact 66A serves to ground the arm of the potentiometer 68 when the function generator 26 is in operative. The function generator is energized by closing a normally-open relay conact 176A. The potentiometer 68 is connected in series with a choke 70 across the output terminals of the function generator 26, and one end of the potentiometer 68 is grounded. The effect of moving the arm of the potentiometer 68 is to vary the output of the function generator (ramp gain). If the ramp gain, as determined by the setting of the arm of the potentiometer 68, is set too high, the weld will "freeze" during the flashing portion of the cycle; if the gain is set to low, the movable platen will be accelerated and continue to move at a constant velocity.

The function generator is of conventional design to produce an output voltage having a parabolic waveform. A suitable type is manufactured and sold by Exact Electronics, Inc., Hillsboro, Oreg. Such a function generator generally utilizes an integrating operation amplifier in which the pulse rate of a voltage impressed across a feedback capacitor is varied in accordance with a predetermined function. The invention is not limited to the use of any particular design of function generator, however.

The movable arm of the potentiometer 68 is also connected through a normally-closed relay contact 72A to a lead 74. The movable arm of the potentiometer 46 in the reference voltage channel 30 is connected through a normally-open relay contact 76A and a normally-open relay contact 72B to the lead 74. The movable arm of the potentiometer 48 in the channel 30 is connected through a normally-closed relay contact 76B and through the normally-open contact 72B to the lead 74. Thus, the lead 74 may carry a control signal resulting from the combined signals present in the channels 30, 32 or a signal emanating from the function generator 26 when it is energized. The foregoing statement assumes, of course, that the relays 66, 72, 76 are in proper conditions to transmit the desired signals to the lead 74.

The sensing and balancing circuit 18 also contains a control channel, designated generally by the numeral 80. The control channel 80 comprises a conventional direct current (D.C.) power supply 82, which is energized from a conventional 120-volt, alternating current source (not shown). Two potentiometers 84, 86 are connected in parallel directly across the output terminals of the power supply 82, and a potentiometer 88 is connected in parallel with the potentiometers 84, 86 through normally-closed relay contacts 90A, 92A. A movable arm of the potentiometer 88 is mechanically connected to be driven by the movable welder platen 12 as shown by the broken line 28 (also, see FIGURE 1). The movable arm of the potentiometer 88 is electrically connected to ground through a resistor 94, and to an input terminal of an amplifier 96. A second input terminal of the amplifier 96 is grounded. The output of the amplifier 96 is connected through a normally-closed relay contact 98A to energize a torque motor 100. The torque motor 100 is mechanically connected to position the movable arm of the potentiometer 84. That portion of the control channel 80 shown in FIGURE 2(a) to the left of the potentiometers 84, 86 is utilized only after the end of a welding cycle and prior to initiation of the next automatically-controlled welding cycle. Its operation will be later described in more detail.

The D.C. output of the power supply 82 appears across the potentiometers 84, 86. As previously pointed out, the movable arm of the potentiometer 84 is connected to the lead 74, so that any signals present on the lead 74 are combined with a portion of the constant voltage signal supplied from the power supply 82. The movable arm of the potentiometer 86, which poentiometer setting controls the rate at which the movable platen is moved to the initial die opening position, is connected to ground through a resistor 102. An output signal from the control channel 80 is taken from across the resistor 102 and supplied to the servo amplifier 14.

It is noted that of the controls thus far described, the potentiometers 46, 48, 68, 86 are mounted on a control panel readily accessible for adjustment by an operator. Knobes which adjust the movable arms of the potentiometers may be labeled "pre-heat balance" for the potentiometer 46, "pre-flash balance" for the potentiometer 48, "ramp gain" for the potentiometer 68, and "limit die opening" for the potentiometer 86. Various other control panel adjustments are provided, as will be later pointed out.

The servo amplifier 14 is of conventional design, and has output leads 104, 106. A pair of actuating coils 108a, 108b, comprising a servo valve 108, are connected in series with a normally-closed relay contact 110A across the output leads 104, 106. A load resistor 112 is connected directly across the leads 104, 106 to provide for dissipation of the servo amplifier output when the normally-closed relay contact 110A is open. A suitable servo amplifier and servo valve are available from MOOG Servocontrols, Inc., East Aurora, N.Y.

The servo amplifier 14 is provided with two gain controls, which are shown as separate from the servo amplifier in FIGURE 2(a), because they are located on the control panel of the apparatus. The gain controls comprise a "pre-flash gain" potentiometer 114, connected as a variable resistor between the output lead 104 and a lead 116 to the servo amplifier through a normally-open relay contact 118A and a normally-closed relay contact 120A connected in series with each other. A "pre-heat gain" potentiometer 122 is connected as a variable resistor between the output lead 104 and the lead 116 through a normally-open relay contact 120B. A normally-closed relay contact 118B as connected in series with the normally-closed contact 120A between the line 116 and another line 124 to the servo amplifier 14. Thus, when both the relays 118, 120 are unenergized, the lines 116, 124 are connected together and the potentiometers 114, 122 are shorted out of the servo amplifier gain control circuit.

Thus far, a number of relay contacts have been mentioned in connection with the circuits into which they are connected. Those relay contacts are actuated by relay coils forming a part of the switching and timing circuitry 24 (FIGURE 1), a portion of which is shown in FIGURE (a) and the remainder of which is shown in FIGURE 2(c). Referring now to FIGURE 2(a), it is seen that a bank of relay actuating coils is energized from a conventional direct-current power supply 126, when a normally-open relay contact 98B connected in the output of the power supply 126 is closed. The power supply 126 is energized from the same 120-volt, alternating current source that energizes the power supply 82 previously mentioned. The power supply 126 is provided with a pair of output conductors 128, 130, with the conductor 128 being energized through the relay contact 98B. Connected directly between the conductors 128, 130 are relay actuating coils 118, 91, 90. Relay coils 76, 120 are connected in parallel with each other and in series with a normally-open relay contact 132A between the lines 128, 130. Relay coils 72, 66 are similarly connected in parallel with each other and in series with a normally-open relay contact 134A between the lines 128, 130. The relay actuating coils for the relay contact sections 98A, 98B, 132A, 134A shown in FIGURE 2(a) will be described in connection with FIGURE 2(c).

That portion of the switching and timing circuitry 24 shown in FIGURE 2(c) includes four input terminals designated 136, 138, 140, 142. The terminals 136, 138, 140 are all connected to one side of a conventional 110-140 are all conected to one side of a conventional 110-volt alternating current source of power, and the terminal 142 is connected to the other side of that source of power. A relay coil 148 is connected between the terminals 140, 142 through a switch 150. A relay coil 152 is connected through a switch 156 between the terminals 138, 142. A relay coil 134 is connected in series through a normally-closed relay contact 162A and either a normally-open contact 132C or a normally-open relay contact 148A between the terminals 136, 142. A relay coil 160 is connected in series with a normally-open relay contact 162B, a normally-open relay contact 132B, and either the normally-open relay contact 148A or the normally-open relay contact 132C between the terminals 136, 142. A relay coil 162 is connected in series with the normally-open contact 132B and either the contact 148A or the contact 132C between the terminals 136, 142. A relay coil 164 is also connected between the terminals 136, 142 either through the normally-open relay contact 132C or through the normally-open relay contact 148A, the relay contacts 148A, 132C being connected in parallel. A relay coil 98 is connected between the terminals 136, 142 through a normally-open relay contact 152A. A relay coil 132 is connected between the terminals 136, 142 either through a normally-open switch 166 or through a normally-open relay contact 132D connected in parallel with the switch 166. A relay coil 110 is connected between the terminals 136, 142 through a normally-open relay contact 160A in series with either a normally-open relay contact 110B or a normally-open switch 168, the switch 168 and the relay contact 110B being connected in parallel. A terminal point 170 is provided that is common to the poles of all of the relay contacts 132D, 110A and the switches 166, 168. Another terminal 172 is common to the other sides of the switch 166 and the relay contact 132D. Still another terminal 174 is common to the second sides of the switch 168 and the relay contact 110A. A relay coil 176 is connected between the input terminals 136, 142 through a normally-open relay contact 160B.

FIGURE 2(b) shows the connections of the preset digital counter 22 shown in FIGURE 1 to the switching and timing circuitry 24 shown in FIGURE 2(c). The preset counter 22 may be a conventional two-channel device such is commercially available from Amtron, Incorporated, of Midlothian, Ill. The counter includes two switches, which are shown in FIGURE 2(c) as switches 166, 168. It is to be understood that the switches 166, 168 are contained within the preset counter 22 and are shown in FIGURE 2(c) only for purposes of clarity of explanation. The counter embodies two adjustments or settings located on the control panel of the apparatus. The first of these settings determines the number of pulses that must be received by the counter before the switch 166 closes. In other words, when the counter 22 reaches its first pre-set count, the terminals 170, 172 shown in FIGURE 2(c) are connected together through the switch 166 to energize the relay 132. When the preset counter reaches its second pre-set count of input pulses determined by the second setting, it closes the switch 168, thus connecting the terminals 170, 174 together and energizing the relay 110, if the relay contact 160A is closed at that time. The pre-set counter 22 is energized and starts to count input pulses supplied to it from the pulse generator 20 when a relay contact 164A is opened. As will later be explained in detail in connection with the operation of the apparatus, the normally-closed relay contact 164A opens when the automatic sequence of welding operations is initiated.

FIGURE 3 shows in some detail that portion of the apparatus for generating the pulses that actuate the preset digital counter 22 previously described. As shown, the movable welder platen 12, previously referred to in connection with FIGURE 1, has secured thereto a die 180 in which a workpiece 182 is clamped. The workpiece 182 has a surface 182a which is to be welded to an opposing surface 184b of a second workpiece 184. The workpiece 184 is clamped in a die 186 secured to a fixed platen 188. The platens 12, 188 have electrodes 190, 192 respectively mounted on their dies 180, 186. The electrodes 190, 192 are connected to opposite ends of a secondary winding 194S of a welding transformer 194. A primary winding 194P of the transformer 194 is connected to a conventional power control unit 196. The primary winding 194P is tapped at various points and the taps are connected to contacts of a selector switch 198, the movable contactor of which is controlled by the power control unit 196, to provide various predetermined primary voltages to the welding transformer 194. Such an arrangement is conventional and well-known to those skilled in the art.

Electrical leads 200a, 200b connect the electrodes 190, 192 to opposite ends of the primary winding 50P of the transformer 50 in the die sensing feedback voltage channel 32 shown in FIGURE 2(a).

The platen motion control unit 10 (also shown in FIGURE 1) hydraulically controls motion of the movable platen 12 toward and away from the fixed or stationary platen 188. The mechanical connection between the platen motion control unit 10 and the movable platen 12 is shown schematically by a connection 201.

The movable plate 12 has a pair of depending lugs 202a, 202b, which receive a screw 204. The screw 204 is of a so-called "ball thread" or "Saginaw" type, whereby motion of the movable platen 12 in a direction parallel to the axis of the screw 204 causes rotation of the screw.

Such arrangements are now well-known in the art. The movable platen 12 is also mechanically connected to position a movable arm of the platen linear motion potentiometer 88, which is also shown in FIGURE 2(a). The setting of the movable arm of the potentiometer 88 reflects the linear position of the movable platen 12.

The Saginaw screw 204 is mechanically connected to the input of the pulse generator 20, which is also shown in FIGURE 1. In the pulse generator, one end of the screw 204 has mounted thereon a disc 206 which rotates with the screw 204. The disc 206 is provided with a plurality of apertures 206a extending from front to back through the disc and arranged in a circular configuration near the periphery of the disc. A lamp 208 is mounted adjacent one side of the disc 206 to project light through the apertures 206a, and a photocell 210 is arranged on the other side of the disc to receive the light emanating from the source 208 and transmitted through the apertures 206a.

As the screw 204 rotates in response to movement of the platen 12, the disc 206 rotates and provides pulses of light through the apertures 206a to the photocell 210. The output of the photocell 210 is connected to the input of a pulse shaping circuit 212, which shapes the pulses received from the photocell 210 into pulses of equal amplitudes and equal widths. The output pulses from the pulse shaping circuit 212 are applied as input pulses to the pre-set digital counter 22 previously described. Thus, it is apparent that the counter 22 receives a voltage pulse from the pulse shaping circuit 212 each time that the movable platen 12 moves a predetermined distance toward the fixed platen 188. This, of course, is equal to the amount that the workpiece 182a moves toward the fixed workpiece 184b.

The pulse generator 20 may conveniently be of the type available from Amtron, Incorporated, Midlothian, Ill., although the invention is not limited to the use of any particular type of pulse generator.

The upset control circuit 16 is also shown in FIGURE 3, although it will be shown and described in greater detail in connection with FIGURE 4. It will be recalled that the upset control circuit 16 takes over control from the servo amplifier 14 in controlling the platen motion control unit 10, when the flash portion of the welding cycle has been completed, and the workpieces are heated to a sufficiently molten state to be ready for the upsetting or final portion of the cycle.

Figure 4:
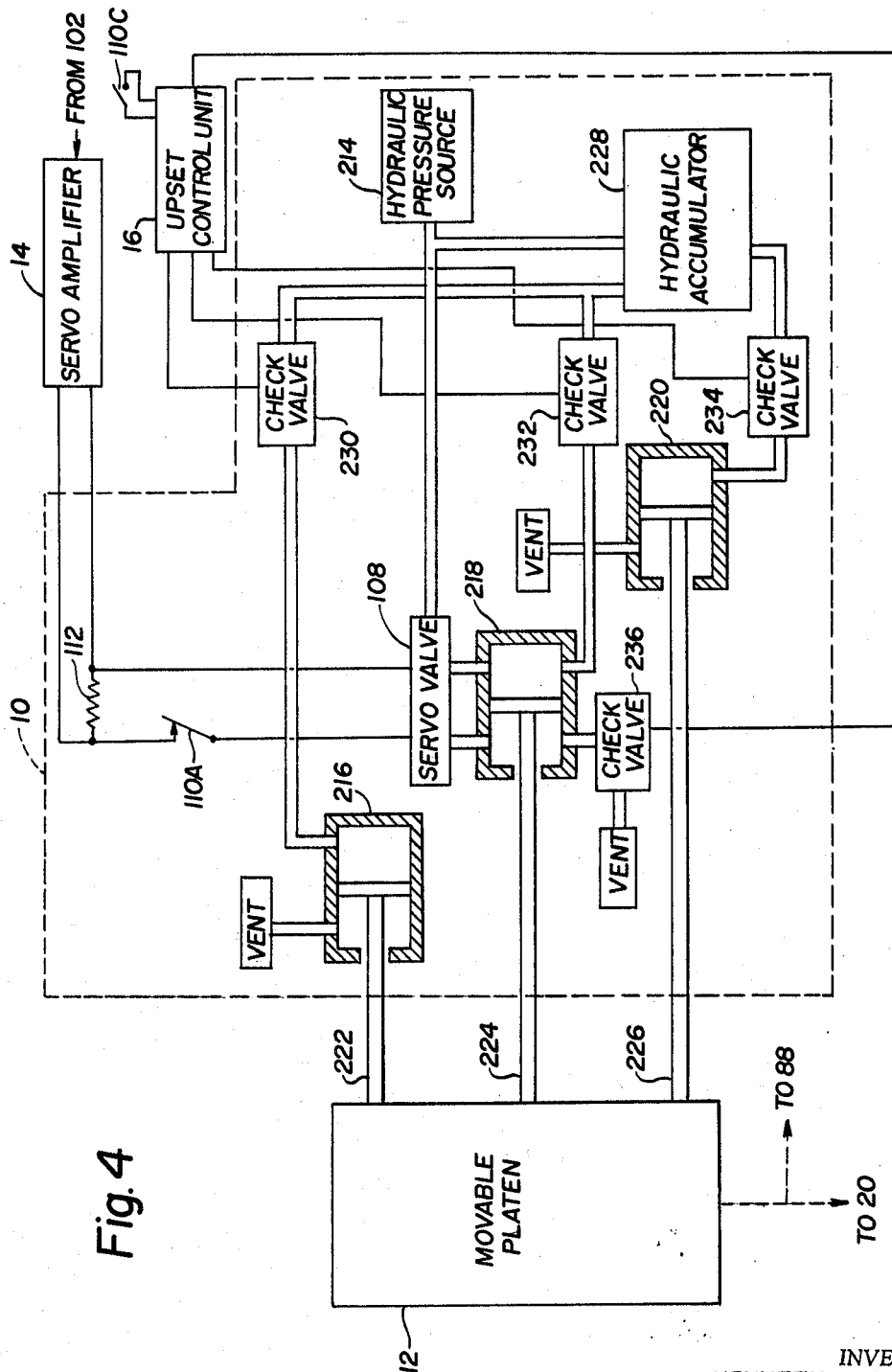
FIGURE 4 is a detailed block diagram of the platen motion control circuit shown in FIGURE 1.

FIGURE 4 illustrates somewhat schematically and in block diagram form the manner in which the platen motion control unit 10 controls the motion of the movable platen 12. As previously pointed out, the motion control unit 10 is responsive to control signals from both the servo amplifier 14 and the upset control unit 16. As shown, the platen motion control unit 10 includes a source of hydraulic pressure 214, which supplies fluid to three hydraulic cylinders 216, 218, 220. The cylinders 216, 218, 220 respectively actuate rods 222, 224, 226, each of which has one end connected to the movable platen 12 and its other end connected to a piston within its corresponding cylinder. Hydraulic fluid is applied directly from the source 214 to the servo valve 108 previously mentioned in connection with FIGURE 2(a), and to a hydraulic accumulator 228. Hydraulic fluid is also supplied to the cylinders 216, 218, 220 through check valves 230, 232, 234, respectively, from the hydraulic accumulator 228. During the pre-flash, pre-heat and flash portions of the welding cycle, the check valves 230, 232, 234, which are electrically controlled by the upset control unit 16, are closed so that fluid does not flow from the accumulator 228 to the three cylinders.

As previously noted and shown in FIGURE 2(a), the servo valve 108 is provided with a pair of coils 108a, 108b. When current flows through the coils 108a, 108b in one direction, the servo valve 108 permits fluid to flow into the hydraulic cylinder 218 to move the rod 224 to the left, as shown in FIGURE 4, and, when current flows through the coils in the reverse direction, the servo valve 108 is actuated to move the rod 224 to the right, as in FIGURE 4. Prior to the start of an automatic welding cycle, the normally-closed relay contact 110A permits the servo valve coils 108a, 108b to be energized in such a manner as to apply hydraulic fluid to the rod end of the cylinder 218 to move the movable platen 12 to the right (as seen in FIGURE 4) to its "initial die opening" position. This position is controlled by microswitches (not shown), and the speed with which the platen 12 moves to this position is determined by the setting of the movable arm of the potentiometer 86 shown in FIGURE 2(a).

When an automatic welding cycle is initiated, current is applied to the servo valve 108 in a direction to cause the valve to apply fluid behind the piston and move the rod 224 and the movable platen 12 to the left, as seen in FIGURE 4. This motion is under control of the servo amplifier 14 and the signal received by the servo amplifier from across the resistor 102 (FIGURE 2(a)). This action occurs during the pre-flash, pre-heat and flash portions of the welding cycle.

When the movable platen 12 has moved a predetermined distance to the left (that is, toward the fixed platen), as measured by the pre-set counter 22, the relay contact 110A is opened to remove control from the servo amplifier 14 (FIGURE 2(a)) and the relay contact 110C is closed to energize the upset control unit 16. When the upset control unit 16 is energized, it opens the check valves 230, 232, 234 between the hydraulic accumulator 228 and the various cylinders, as well as opening a check valve 236 through which the rod of the cylinder 218 is vented. The servo valve 108 is closed by the opening of the relay contact 110A, so that hydraulic fluid is no longer available from the source 214 through the servo valve 108 to the cylinder 218.

When the upset control unit 16 is energized and the check valves 230, 232, 234, 236 are opened, hydraulic fluid under high pressure is simultaneously applied inside the piston ends of the cylinders 216, 218, 220 from the hydraulic accumulator 228. The accumulator 228 contains hydraulic fluid under pressure from the hydraulic pressure source 214 in a quantity sufficient to activate all three of the cylinders 216, 218, 220 simultaneously. Accordingly, the movable platen 12 is moved to the left (as seen in FIGURE 4) into its upset position, where it is maintained until a proper weld is formed between the abutting surfaces of the two workpieces. At the end of the upset portion of the welding cycle, the pressure from the hydraulic cylinders may be released under the control of a signal from a timer (not shown) or under the control of an operator. Such operation is well-known and conventional in the art. The movable platen 12 then moves back to its limit die open position as previously described.

It is pointed out that all three cylinders 216, 218, 220 move the movable platen 12 forward toward the fixed platen during the upset portion of the welding cycle, whereas only the cylinder 218 moves the platen during the other portions of the cycle. The use of all three cylinders during the upset portion of the cycle enables a single servo valve to control the movement of the platen during the other portions of the cycle, instead of requiring the use of a plurality of valves with a complex control system to maintain them operating in synchronism.

The operation of the apparatus embodying the invention will now be described with particular reference to FIGURES 2(a), (b), (c), with additional references to other figures as they are required. A welding operation is initiated by closing a power control switch (not shown) to energize the transformer 34, power supplies 82, 126 and various other components such as the servo amplifier 14, and the function generator 26, all shown in FIGURE 2(a), the pre-set counter 22 shown in FIGURE 2(b), and the power control unit 196 shown in FIGURE 3, and the upset control unit 16 and hydraulic pressure source 214 shown in FIGURE 4. Closing the aforementioned switch also connects the terminals 136, 138, 140 with one side of an alternating current supply line (not shown) and connects the terminal 142 with the other side of the line (FIGURE 2(c)). At this time, all relays are in their de-energized conditions, and their contacts are as shown in the various figures of the drawings. It is assumed that the movable platen 12 has been moved away from the fixed platen to a position dictated by the setting of the movable arm of the die opening potentiometer 86 (FIGURE 2(a)), which occurs at the end of the prior cycle of operation.

When a welding cycle is completed, the only voltage applied to the servo amplifier 14 is that due to the output of the power supply 82 appearing across the potentiometer 86, a portion of which appears across the resistor 102. When an automatic welding cycle is completed, the power supply 126 is de-energized, and the normally-closed relay contacts 90A, 92A close in the control channel 80. This causes a voltage to appear across the potentiometer 88, a portion of which is supplied to the amplifier 96 to energize the torque motor 100 through normally-closed contacts 98A. The torque motor is mechanically connected (through conventional means not shown) to position the movable arm of the potentiometer 84, and the movable arm of the potentiometer 88 is similarly positioned by the movable platen 12. So long as a voltage signal is provided to the amplifier 96 from the potentiometer, 88 the torque motor 100 will run to move the arm of the potentiometer 84. When the platen has moved to a position such that the voltage on the movable arm of the potentiometer 88 is substantially zero and the torque motor 100 is no longer moving the arm of the potentiometer 84, the arm of the potentiometer 84 has a voltage on it such that sudden application of a signal from the channel 30 (through the contact 72B) at the start of the next automatic welding cycle will not cause an unduly large signal to appear suddenly across the resistor 102 at the input of the servo amplifier 14. This condition occurs when the movable platen has moved to the initial opening position, where the circuitry is de-energized.

The first action to be taken prior to initiating an automatic welding cycle is to clamp the workpieces 182, 184 to be welded into their respective dies 180, 186 (FIGURE 3). The switch 156 shown diagrammatically in FIGURE 2(c) is automatically closed by the die clamps when the workpieces are clamped in place. Closing the switch 156 energizes the relay 152, which closes the normally-open contact 152A and energizes relay 98. Before the switch 156 is closed, the torque motor 100 is energized through the normally-closed relay contact 98A to position the movable arm of the potentiometer 84 so that a balance is obtained between the position of that arm and the arm of the potentiometer 88. This provides that no sudden adjustment or abrupt motion will be required of the movable platen 12 when the automatic welding cycle is initiated. When the relay 98 is energized, it opens the normally-closed contact 98A in the circuit of the torque motor 100, and closes the normally-open contact 98B in the output of the power supply 126. This latter action results in the energization of the bank of relays shown on the right side of FIGURE 2(a).

When the contact 98B is closed, the relays 118, 92, 90 are energized. When the relay 18 is energized, it closes the contact 118A and opens the contact 118B in the servo amplifier 14 to connect the pre-flash gain control potentiometer 114 into circuit in the servo amplifier. Up until that point in time, neither of the potentiometers 114, 122 has been energized because the relay contacts 120A, 118B have both closed, thus connecting the leads 116, 124 together. Energizing the relays 90, 92 opens the normally-closed contacts 90A, 92A and completely disconnects the potentiometer 88, the amplifier 96 and the torque motor 100 from the control channel 80, and prevents any further automatic movement of the arm of the potentiometer 84.

After the workpieces have been clamped in place in their respective dies, the dies are in their initially open position, the control channel 80 is balanced, and all power supplies and components are energized, the sequence of welding operations is ready to be started. This is initiated by manually closing the switch 150 to energize the relay 148. When the relay 148 is energized, several actions occur. First, the normally-open relay contact 148A closes to energize the relay 164. When the relay 164 is energized, it opens the contact 164A and disconnects the pre-set counter 22 from ground, thus enabling the counter to count incoming pulses from the pulse generator 20. The relay 134 is also energized at that time through the now-closed contact 148A and the normally-closed contact 162A. Energizing relay 134 closes contact 134A (FIGURE 2(a)), and energizes the relays 66, 72. Energizing the relay 66 closes the normally-open contact 66A and connects to ground the movable arm of the potentiometer 68 across the function generator 26. Energizing the relay 72 opens the contact 72A that connects the movable arm of the potentiometer 68 to the line 74, and closes the contact 72B that connects the movable arm of the pre-flash balance potentiometer 48 to the line 74 through the normally-closed contact 76B.

Thus, a first reference voltage is impressed on the lead 74 from the reference voltage channel 34, this voltage being modified by the die-sensing feedback voltage developed through the channel 32. These combined voltages impressed on the circuitry comprising the potentiometers 84, 86 and the power supply 82 cause a voltage to appear across the resistor 102 to actuate the servo amplifier 14. The output of the servo amplifier 14 is impressed across the servo valve control 108 through the normally-closed relay contact 110A and causes the movable platen 12 to move toward the stationary platen 188 and causes pulses to be provided from the pulse generator 20 to the digital counter 22 corresponding to predetermined increments of distance moved by the platen 12. When the movable platen has moved a predetermined distance toward the fixed platen, as determined by the number of pulses pre-set into the counter 22, the first or pre-flash portion of the welding cycle is terminated, and the second or pre-heat portion is automatically initiated.

When the pre-set counter 22 reaches its first pre-set count, it connects the terminal 170 to the terminal 172 by closing the switch 166. This energizes the relay 132, which closes the holding contact 132D to maintain the relay 132 in an energized condition. When the relay 132 is energized, the contact 132A closes, which, in turn, energizes the relays 76, 120. Energizing the relay 76 closes the contact 76A and opens the contact 76B, thus connecting the arm of the pre-heat balance potentiometer 46 to the lead 74, rather than the arm of the pre-flash balance potentiometer 48. Energizing the relay 120 changes the servo amplifier gain control circuitry, in that the contact 120A opens and the contact 120B closes. Thus, the pre-heat gain control potentiometer 122 is connected between the lines 104, 116 and the pre-flash gain potentiometer 114 is taken out of the circuit by the opening of the contact 120A. Energization of the relay 132 also causes the normally-open relay contacts 132B, 132C to close, thus applying power to the relay 162. The relay 162, however, embodies a time delay mechanism, so that it will be energized only after a predetermined length of time has elapsed. This predetermined length of time determines the duration of the pre-heat portion of the welding cycle. Time delay relays such as the relay 162 are well-known in the art and are readily available commercially. For example, a suitable time delay relay is available from General Electric Company, Schenectady, N.Y.

During the pre-heat portion of the welding cycle, the movable platen moves toward the fixed platen under control of the reference voltage from the pre-heat balance potentiometer 46, as modified by the voltage produced through the die feedback circuit 32. Although the pre-set digital counter 22 is counted pulses as the movable platen moves toward the stationary platen, the pre-heat portion of the cycle is terminated by the time delay relay 162, rather than by any predetermined count being reached by the counter 22. The time delay provided by the time delay relay 162 is set into the relay by the operator at the beginning of the welding operation.

At the expiration of the pre-heat portion of the cycle determined by the time delay set into the relay 162, the relay 162 is energized through the contacts 132B, 132C. This action initiates the flash portion of the welding cycle through changes of condition of a number of relays and their contacts. First, the normally-closed relay contact 162A opens, which de-energizes the relay 134. De-energizing the relay 134 causes the contact 134A to open, thus de-energizing relays 66, 72. When the relay 66 is de-energized, the contact 66A opens, thus disconnecting the movable arm of the potentiometer 68 from ground. When the relay 72 is de-energized, the contact 72A closes, thus connecting the movable arm of the potentiometer 68 to the lead 74; the contact 72B opens, thus disconnecting both channels 32, 34 from the lead 74. The voltage applied to the comparison circiut through the movable arm of the potentiometer 84 is the third reference voltage, which is taken from the movable arm of the potentiometer 68 connected across the output of the function generator 26.

Energizing the relay 162 also closes the contact 162B, thus energizing the relay 160. This, in turn, closes the contact 160A in series with the relay 110. The relay 110 is not energized, however, because the switch 168 and the relay contact 110B are open. The relay contact 160B closes, which energizes the relay 176. This action closes the contact 176A, which energizes the function generator 26. Thus, during the flash potion of the welding cycle, motion of the movable platen toward the fixed platen is completely controlled by the output of the function generator 26, transmitted from the potentiometer 68 through the lead 74 to the comparison circuit 80. It will be recalled that at this time the pre-set counter 22 remains energized and is counting pulses provided to it from the pulse generator 20 as the movable platen moves toward the fixed platen.

As previously noted, the output of the function generator 26 is a signal having a parabolic waveform. It is understood, however, that the invention is not limited to the provision of a signal having any particular type of waveform, although a parabolic shape is preferred for most types of welding. When the movable platen has moved a predetermined distance toward the fixed platen, as determined by a certain number of pulses being received by the counter 22 from the pulse generator 20, the flash portion of the welding cycle is terminated. At this point in time, the abutting surfaces of the workpieces are substantially in contact with each other and heated to a molten condition preparatory to upsetting and completing the weld. When the counter has registered a second pre-set number of counts, indicating that the flash portion of the cycle should be terminated, the counter functions to close the switch 168, thus energizing the relay 110. The contact 110B closes thus holding the relay 110 in an energized condition. The relay contact 110A opens to disconnect the output of the servo amplifier 14 from the servo valve control 108. Simultaneously, the relay contact 110C closes to actuate the upset control unit 16 for the final step in the automatic welding process. An upset control unit, such as the unit 16, is embodied in virtually every commercially available flash welder. Its operation is well-known to those skilled in the art, and will not be described here in detail. As previously noted, when the upset control unit is actuated by closing the relay contact 110C, the check valves 230, 232, 234, 236 (FIGURE 4) are opened to permit hydraulic fluid to flow into the cylinders 216, 218, 220 and force the movable workpiece against the fixed workpiece. This action upsets the molten metal of the workpieces 182, 184 adjacent their abutting surfaces 182a, 184b, and completes the flash welding process. The upsetting portion of the cycle is generally terminated by a timer embodied in the upset control unit. After the upset portion of the cycle is terminated, one of the workpieces 182, 184 is released from its respective die 180, 186, and the movable platen 12 is returned to its initial limit die opening positoin. At this time, the other workpiece may be removed from its die and the welded product passed to another station in a manufacturing process.

In recapitulating briefly, it is seen that the automatic welding cycle performed acording to the method and by the apparatus of the invention comprises four portions. During the first or pre-flash portion of the cycle, control of motion of the movable platen toward the fixed platen is by means of a first reference voltage modified by a feedback voltage proportional to the voltage drop existing between the two workpieces to be welded together. This portion of the cycle is terminated when the movable workpiece has moved a predetermined distance toward the fixed workpiece. During the second or pre-heat portion of the welding cycle, motion of the movable workpiece toward the stationary workpiece is controlled by a second reference voltage, modified again by the feedback voltage proportional to the voltage drop between the two workpieces. This portion of the cycle is terminated at a predetermined time by means of a mechanical timer. During the third or flash portion of the welding cycle, movement of the movable workpiece toward the stationary workpiece is controlled by the output of an analog function generator, which preferably has an output waveform of parabolic shape. This third portion of the cycle is terminated when the movable workpiece has moved a predetermined total distance from its initial position toward the stationary workpiece. During the fourth or upset portion of the welding cycle, motion of the movable workpiece toward the fixed workpiece is controlled strictly by the design of the hydraulic platen motion control unit. Thus, it is apparent that the invention has obtained the objectives set forth.

Although an embodiment of the invention has been shown and described in detail, it is apparent that many changes and modifications may be made by one skilled in the art without departing from the true scope and spirit of the invention.

What is claimed is:

1. In a method of flash welding together two workpieces, the steps of:
   (a) positioning said workpieces a predetermined distance apart at a first position;
   (b) applying a voltage between said workpieces;
   (c) providing a feedback signal from said workpieces proportional to voltage drop between said workpieces; and
   (d) moving said workpieces relatively toward one another from said first position to a second position at a rate which is a function of said feedback signal.

2. The method of claim 1, further including the steps of:
   (e) providing an output signal in accordance with a predetermined function; and
   (f) moving said workpieces relatively toward one another from said second position to a third position at a rate determined by said output signal.

3. In a method of flash welding together two workpieces, the steps of:
   (a) positioning said workpieces a predetermined distance apart at a first position;
   (b) applying a voltage between said workpieces;
   (c) providing a constant reference signal;
   (d) providing a feedback signal from said workpieces proportional to voltage drop between said workpieces;
(e) combining said reference signal and said feedback signal to provide a first output signal; and
(f) moving said workpieces relatively toward one another from said first position to a second position at a first rate determined by said first output signal.

4. The method of claim 3, further including the steps of:
(g) providing a second output signal in accordance with a predetermined function; and
(h) moving said workpieces relatively toward one another from said second position to a third position at a rate determined by said second output signal.

5. In a method of flash welding together two workpieces, the steps of:
(a) positioning said workpieces a predetermined distance apart at a first position;
(b) applying a voltage between said workpieces;
(c) providing first and second constant reference signals;
(d) providing a feedback signal proportional to voltage drop between said workpieces;
(e) combining said first reference signal and said feedback signal to provide a first output signal;
(f) combining said second reference signal and said feedback signal to provide a second output signal;
(g) moving said workpieces relatively toward one another from said first position to a second position at a first rate determined by said first output signal; and
(h) moving said workpieces relatively toward one another from said second position to a third position at a second rate determined by said second output signal.

6. The method of claim 5, wherein at said second position said workpieces have moved relative to each other a predetermined distance from said first position.

7. The method of claim 5, wherein relative movement of said workpieces between said second position and said third position occurs for a predetermined length of time.

8. The method of claim 5, wherein said first and second output signals are variable.

9. The method of claim 5, further including the steps of:
(i) providing a third output signal in accordance with a predetermined function; and
(j) moving said workpieces relatively toward one another from said third position to a fourth position at a third rate determined by said third output signal.

10. The method of claim 9, wherein at said fourth position said workpieces have moved relative to each other a predetermined distance from said first position.

11. The method of claim 9, wherein said first, second and third output signals are variable.

12. The method of claim 11, wherein said predetermined function is parabolic.

13. In a method of flash welding together two workpieces, the steps of:
(a) positioning said workpieces a predetermined distance apart at a first position;
(b) applying a voltage between said workpieces;
(c) providing first and second constant reference voltages;
(d) providing a variable feedback voltage proportional to voltage drop between said workpieces;
(e) combining said first reference voltage and said feedback voltage to provide a first variable output voltage;
(f) combining said second reference voltage and said feedback voltage to provide a second variable output voltage;
(g) moving said workpieces relatively toward one another from said first position a predetermined distance to a second position, at a first rate determined by said first output voltage;
(h) moving said workpieces relatively toward one another from said second position for a predetermined length of time to a third position, at a second rate determined by said second output voltage;
(i) providing a third variable output voltage in accordance with a predetermined function; and
(j) moving said workpieces relatively toward one another from said third position to a fourth position a predetermined distance from said first position, at a third rate determined by said third output voltage.

14. The method of claim 13, wherein said predetermined function is parabolic.

15. In flash welding apparatus for welding together two workpieces, the combination comprising:
(a) first and second relatively movable means for respectively holding said workpieces;
(b) controllable means for moving said movable means relative to each other;
(c) means electrically connected to said workpieces for applying a voltage between said workpieces;
(d) means connected to said workpieces for providing a feedback signal proportional to voltage drop between said workpieces; and
(e) means for supplying said feedback signal to said controllable means to move said first and second relatively movable means toward each other from a first position to a second position at a rate of speed which is a function of said feedback signal.

16. In flash welding apparatus for welding together two workpieces, the combination comprising:
(a) first and second relatively movable means for respectively holding said workpieces;
(b) controllable means for moving said movable means relative to each other;
(c) means electrically connected to said workpieces for applying a welding voltage between said workpieces;
(d) means connected to said workpieces for providing a feedback signal proportional to voltage drop between said workpieces;
(e) means for providing a constant reference signal;
(f) means for combining said reference signal and said feedback signal to provide an output signal; and
(g) means for supplying said output signal to said controllable means to move said first and second relatively movable means toward each other from a first position to a second position at a rate of speed determined by said output signal.

17. In flash welding apparatus for welding together two workpieces, the combination comprising:
(a) first and second relatively movable means for respectively holding said workpieces;
(b) controllable means for moving said movable means relative to each other;
(c) means electrically connected to said workpieces for applying a welding voltage between said workpieces;
(d) means connected to said workpieces for providing a feedback signal proportional to voltage drop between said workpieces;
(e) means for providing first and second constant reference signals;
(f) means for combining said first reference signal and said feedback signal to provide a first output signal;
(g) means for combining said second reference signal and said feedback signal to provide a second output signal; and
(h) switch means for selectively supplying said first and second output signals to said controllable means to move said first and second relatively movable means toward each other from a first position to a second position at a first rate of speed determined by said first output signal and from said second position to a third position at a second rate of speed determined by said second output signal.

18. The apparatus of claim 17, wherein said second position is a predetermined distance from said first position.

19. The apparatus of claim 17, wherein said movable means moves from said second position to said third position during a predetermined time interval.

20. The apparatus of claim 17, wherein said first output signal is variable.

21. The apparatus of claim 17, wherein said second output signal is variable.

22. The apparatus of claim 17, wherein said first rate of speed is variable and said second position is a predetermined distance from said first position.

23. The apparatus of claim 17, wherein said second rate of speed is variable and said movable means moves from said second position to said third position during a predetermined time interval.

24. The apparatus of claim 17, wherein said second position is a predetermined distance from said first position and wherein said movable means moves from said second position to said third position during a predetermined time interval.

25. The apparatus of claim 17, wherein said first rate of speed is variable and said second position is a predetermined distance from said first position, and wherein said second rate of speed is variable and said movable means moves from said second position to said third position during a predetermined time interval.

26. The apparatus of claim 17, wherein said feedback signal, said reference signals and said output signals are voltages.

27. The apparatus of claim 25, wherein said feedback signal, said reference signals and said output signals are voltages.

28. The apparatus of claim 17, further including means for moving said movable means relative to each other to said first position.

29. The apparatus of claim 17, further including distance measuring means responsive to movement of said relatively movable means for actuating said switch means to remove said first output signal from said controllable means and provide said second output signal to said controllable means when said movable means have moved a predetermined distance from said first position to said second position.

30. The apparatus of claim 17, further including timing means for actuating said switch means to remove said second output signal from said controllable means after a predetermined length of time when said relatively movable means has moved from said second position to said third position.

31. The apparatus of claim 17, further including distance measuring means responsive to movement of said relatively movable means for actuating said switch means to remove said first output signal from said controllable means and provide said second output signal to said controllable means when said movable means have moved a predetermined distance from said first position to said second position, and timing means for actuating said switch means to remove said second output signal from said controllable means after a predetermined length of time when said relatively movable means has moved from said second position to said third position.

32. In flash welding apparatus for welding together two workpieces, the combination comprising:
(a) first and second relatively movable means for respectively holding said workpieces;
(b) controllable means for moving said movable means relative to each other;
(c) means electrically connected to said workpieces for applying a voltage between said workpieces;
(d) means connected to said workpieces for providing a feedback signal proportional to voltage drop between said workpieces;
(e) means for providing an output signal in accordance with a predetermined function; and
(f) switch means for selectively supplying said feedback signal and said output signal to said controllable means to move said first and second relatively movable means toward each other from a first position to a second position at a first rate of speed which is a function of said feedback signal, and from said second position to a third position at a second rate of speed determined by said output signal.

33. In flash welding apparatus for welding together two workpieces, the combination comprising:
(a) first and second relatively movable means for respectively holding said workpieces;
(b) controllable means for moving said movable means relative to each other;
(c) means electrically connected to said workpieces for applying a voltage between said workpieces;
(d) means connected to said workpieces for providing a feedback signal proportional to voltage drop between said workpieces;
(e) means for providing a constant reference signal;
(f) means for combining said reference signal and said feedback signal to provide a first output signal;
(g) means for providing a second output signal in accordance with a predetermined function; and
(h) switch means for selectively supplying said first and second output signals to said controllable means to move said first and second relatively movable means toward each other from a first position to a second position at a first rate of speed determined by said first output signal and from said second position to a third position at a second rate of speed determined by said second output signal.

34. In flash welding apparatus for welding together two workpieces, the combination comprising:
(a) first and second relatively movable means for respectively holding said workpieces;
(b) controllable means for moving said movable means relative to each other;
(c) means electrically connected to said workpieces for applying a voltage between said workpieces;
(d) means connected to said workpieces for providing a feedback signal proportional to voltage drop between said workpieces;
(e) means for providing first and second constant reference signals;
(f) means for combining said first reference signal and said feedback signal to provide a first output signal;
(g) means for combining said second reference signal and said feedback signal to provide a second output signal;
(h) means for providing a third output signal in accordance with a predetermined function; and
(i) switch means for selectively supplying said first, second and third output signals to said controllable means to move said first and second relatively movable means toward each other from a first position to a second position at a first rate of speed determined by said first output signal, from said second position to a third position at a second rate of speed determined by said second output signal, and from said third position to a fourth position at a third rate of speed determined by said third output signal.

35. The apparatus of claim 34, wherein said first rate of speed is variable and said second position is a predetermined distance from said first position.

36. The apparatus of claim 34, wherein said second rate of speed is variable and said movable means moves from said second position to said third position during a predetermined time interval.

37. The apparatus of claim 34, wherein said third rate of speed is variable and said fourth position is a predetermined distance from said first position.

38. The apparatus of claim 34, wherein said first rate of speed is variable and said second position is a predetermined distance from said first position, and wherein said second rate of speed is variable and said movable means moves from said second position to said third position during a predetermined time interval, and wherein said third rate of speed is variable and said fourth position is a predetermined distance from said first position.

39. The apparatus of claim 34, further including means for moving said movable means relative to each other to said first position.

40. The apparatus of claim 34, further including distance measuring means responsive to movement of said relatively movable means for actuating said switch means to remove said first output signal from said controllable means and provide said second output signal to said controllable means when said movable means have moved a predetermined distance from said first position to said second position.

41. The apparatus of claim 34, further including timing means for actuating said switch means to remove said second output signal from said controllable means after a predetermined length of time when said relatively movable means has moved from said second position to said third position.

42. The apparatus of claim 34, further including distance measuring means responsive to movement of said relatively movable means for actuating said switch means to remove said third output signal from said controllable means when said movable means have moved a predetermined distance from said first position to said fourth position.

43. The apparatus of claim 34, further including distance measuring means responsive to movement of said relatively movable means for actuating said switch means to remove said first output signal from said controllable means and provide said second output signal to said controllable means when said movable means have moved a predetermined distance from said first position to said second position and for actuating said switch means to remove said third output signal from said controllable means when said movable means have moved a predetermined distance from said first position to said fourth position, and timing means for actuating said switch means to remove said second output signal from said controllable means and provide said third output signal to said controllable means after a predetermined length of time when said movable means has moved from said second position to said third position.

44. The apparatus of claim 34, wherein said output signals are voltages.

45. The apparatus of claim 34, wherein said predetermined function is parabolic.

46. The apparatus of claim 38, wherein said output signals are voltages.

47. The apparatus of claim 43, wherein said output signals are voltages.

48. The apparatus of claim 38, wherein said predetermined function is parabolic.

References Cited

UNITED STATES PATENTS

| | | | |
|---|---|---|---|
| 2,727,969 | 12/1955 | Platte | 219—100 X |
| 2,770,709 | 11/1956 | Moore et al. | 219—97 |
| 3,204,078 | 8/1965 | Cavanagh | 219—97 |

JOSEPH V. TRUHE, Primary Examiner

M. C. FLIESLER, Assistant Examiner

U.S. Cl. X.R.

219—100

PO-1050
(5/69)

UNITED STATES PATENT OFFICE
CERTIFICATE OF CORRECTION

Patent No. 3,479,480    Dated November 18, 1969

Inventor(s) Kenneth L. Erwin and Ross W. Lodwick

It is certified that error appears in the above-identified patent and that said Letters Patent are hereby corrected as shown below:

Column 7, line 19, "48" should be --46--
"        line 61, "to" should be --too--

Column 8, line 54 "Knobes" should be --Knobs--

Column 9, line 19, the digit "2" should be inserted after URE before (a)
"        line 32, "91" should be --92--
"        line 45 is a duplication of line 44

Column 10, line 71, "plate" should be --platen--

Column 13, line 66, "18" should be --118--

Column 15, line 6, "counted" should be --counting--
"         line 28, "circiut" should be --circuit--
"         line 40, "potion" should be --portion--

SIGNED AND
SEALED
JUN 23 1970

(SEAL)
Attest:

Edward M. Fletcher, Jr.
Attesting Officer

WILLIAM E. SCHUYLER, JR.
Commissioner of Patents